United States Patent [19]

Naumann et al.

[11] 3,725,313
[45] Apr. 3, 1973

[54] SUSPENSION STABILIZERS

[75] Inventors: Günter Naumann; Nikolaus Schön, both of Leverkusen; Hildegard Schnöring, Wuppertal-Elberfeld; Gottfried Pampus, Leverkusen, all of Germany

[73] Assignee: Bayer Aktiengesellschaft, Leverkusen, Germany

[22] Filed: Apr. 9, 1971

[21] Appl. No.: 132,913

[30] Foreign Application Priority Data

Apr. 18, 1970 Germany...................P 20 18 733.1

[52] U.S. Cl. ...........................260/2.1 R, 260/2 BP
[51] Int. Cl. ............................................C08g 23/12
[58] Field of Search ...................................260/2.1 R

[56] References Cited

UNITED STATES PATENTS 3,005,786  10/1961  Greer......................................260/2.1

FOREIGN PATENTS OR APPLICATIONS 113,269  7/1964  Czechoslovakia

Primary Examiner—Melvin Goldstein
Attorney—Connolly and Hutz

[57] ABSTRACT

This invention relates to the use of rubber-like homopolymers and copolymers of conjugated diolefines or of cycloalkenamers as dispersion agents for the suspension condensation of epihalohydrins and polyalkylene polyamines.

4 Claims, No Drawings

SUSPENSION STABILIZERS

The preparation of condensation products of polyalkylene polyamines with epihalohydrins in the form of beads and the use of such condensates as anion exchangers is already known.

According to U.S. Pat. No. 3,005,786, a precondensate of epihalohydrin and polyalkylene polyamine may be prepared in the presence of water and suspended in an organic liquid which contains a dispersing agent, and polycondensation may then be completed in the suspension. Polycondensate beads which may be used as ion exchangers are obtained.

It has also been tried to carry out this method of preparation without the step of precondensation. In this case, one starts with a suspension of water in an organic liquid and the two monomers are introduced into the suspension one after the other and condensed to form beads. For this method it is also advantageous to use a dispersing agent.

The dispersion agents hitherto used for this polycondensation are not satisfactory. They give rise to beads of irregular shape covering a very wide range of sizes. Moreover the results are difficult to reproduce. Bead condensates which are used as ion exchangers should have particle sizes ranging from about 0.4 mm to about 0.8 mm because larger beads have less exchange capacity whereas smaller beads congest the usual ion exchanger filters.

This invention relates to the use of rubber-like homopolymers and copolymers of conjugated diolefines or of cycloalkenamers as dispersion agents for the suspension condensation of epihalohydrins and polyalkylene polyamines.

Suspension condensation in this context denotes the processes mentioned above for the production of polycondensates from epihalohydrins and polyalkylene amines. The usual method of carrying out this process will now be described briefly.

1 Mol of polyalkylenepolyamine is first dissolved in 10 to 50 mols of water and the solution is cooled to about 10° to 30° C. 1 to 4 mols of epihalohydrin are then slowly added to this solution with constant cooling so that the reaction temperature does not rise substantially above 40° C. Condensation takes place to yield a syrupy mass. This mass is then suspended with stirring in an organic liquid which is not miscible with the syrup; this is carried out in the presence of about 0.01 to 5 percent by weight of a dispersing agent, based on the amount of organic liquid. The suspended droplets of syrup are hardened by heating to temperatures of up to 150° C. and then isolated by the usual methods of separating liquids and solids, e.g., by filtration.

Polyalkylene polyamines which are suitable for the process are, for example, those which contain 1 to 10 NH groups attached to two to four carbon atoms by alkylene radicals. Examples of such polyalkylene polyamines are diethylene triamine, triethylene tetramine, tetraethylenepentamine and pentaethylenehexamine.

Suitable organic liquids are hydrocarbons or halogenated hydrocarbons, especially aromatic hydrocarbons, in which the precondensate is insoluble. Orthodichlorobenzene and mixtures of orthodichlorobenzene with chlorobenzene and/or with isododecane have been found to be especially suitable.

Alternatively, precondensation may be omitted, in which case water is first suspended in the organic liquid and the polyalkylenepolyamine is then added, followed by the epihalohydrin. The conditions are otherwise the same. Care should be taken, however, to ensure that the density of the organic liquid does not differ substantially from the density of the monomers which are to be reacted.

According to the invention, the dispersing agents used for this process are rubber-like homopolymers and copolymers of a conjugated diolefines and/or cycloalkenamers in quantities of 0.01 to 5 percent by weight based on the weight of the organic liquid. Compounds especially suitable for this purpose are homopolymers of conjugated diolefines such as buta-1,3-diene, isoprene or penta-1,3-diene, polymers of mixtures of these diolefines and copolymers of these diolefines with $\alpha$-olefines such as styrene, acrylic esters and isobutylene. The method of preparing such copolymers is known. The copolymers are generally prepared in organic solutions with alkali metal alkylene or organometallic mixed catalysts of the Ziegler type. So-called alfin catalysts or cationic catalysts are also used; polymerization may also be carried out with radical catalysts in emulsion or dispersion. Especially suitable polymers are cis-1,4-polybutadiene, cis-1,4-polyisoprene, styrene butadiene rubber in which the monomers are distributed statistically or in blocks, and isobutylene isoprene copolymers.

Rubber-like polymers and copolymers obtained by ring opening polymerization of cycloolefines, especially of cyclopentene, are also suitable, especially transpolypentenamer.

When using the dispersing agents according to the invention, the products obtained are, surprisingly, polycondensation products in the form of beads with a very narrow range of particle sizes. The proportion of beads having a diameter of 0.4 to 0.8 mm can easily be increased to 90 percent in the polycondensate regardless of the method used for mixing the starting materials. This excellent result is surprisingly much less dependent on the conditions under which stirring is carried out when preparing the suspension in the course of the reaction, for example the speed of rotation of the stirrer, than when using the low dispersing agents such as polyacrylic esters, halogenated polyolefines or polystyrene. For a process carried out on a technical scale, this has the advantage of providing the required reproducibility and reliability of the process.

Moreover, when using the dispersing agents according to the invention the process may be carried out with a much more advantageous ratio of non-aqueous phase to quantity of suspended condensation product because much more highly concentrated suspensions can be produced without any loss in quality of the beads of condensate obtained.

EXAMPLE 1

A mixture of 910 parts by weight of chlorobenzene and 1,080 parts by weight of o-dichlorobenzene is introduced into a reaction vessel equipped with stirrer, thermometer and dropping funnel. 20 Parts by weight of a cis-1,4-polybutadiene which was prepared by means of a titanium iodide catalyst and according to the IR spectrum contains 94 percent of cis-1,4-linkages and has an intrinsic viscosity [$\eta$] of 3.6 are dissolved in the aforesaid mixture. 264 Parts by weight of water followed by 205 parts by weight of triethylene tetramine are then slowly run into this solution. The suspension is maintained at 20° to 30° C. by cooling with ice. 313 Parts by weight of epichlorohydrin are added dropwise to the suspension; the temperature during this time should be kept below 30° C. The mixture is then heated on an oil bath for several hours while being constantly stirred at the rate of 220 revs/min. When a temperature of about 100° C. is reached, an azeotropic mixture of water and chlorobenzene begins to distil. After removal of most of the water, the temperature is raised to 140° C. and maintained at this level for 2 hours. After cooling of the mixture, the beads of resin formed are filtered from the liquid and then freed by steam distillation from residues of solvent adhering thereto. After treatment of the resin with sodium hydroxide solution and washing with water, an anion exchanger having a total volumetric capacity of 2.4 Val/l and consisting of more than 80 percent of particles having a diameter of between 0.4 and 0.8 mm and to an extent of more than 90 percent of particles having a diameter of between 0.3 and 0.8 mm was obtained.

EXAMPLE 2

450 Parts by weight of water and 200 parts by weight of diethylene triamine are introduced into a reaction vessel equipped with stirrer, thermometer and dropping funnel. The mixture is stirred and cooled to 30° C. 400 Parts by weight of epichlorohydrin are then added dropwise, the temperature being kept below 30° C. during this addition. The precondensate is introduced into another reaction vessel containing a solution of 20 parts by weight of cis-1,4-polybutadiene of the type defined in Example 1 in 1,800 parts by weight of chlorobenzene. The reaction mixture is stirred at a constant rate of 200 revs/min and the procedure continues as described in Example 1. An anion exchanger having a total volumetric capacity of 2.5 Val/l and consisting of more than 80 percent of particles having a diameter of between 0.4 and 0.8 mm and to an extent of more than 90 percent of particles having a diameter of between 0.3 and 0.8 mm is obtained.

EXAMPLE 3

1,800 Parts by weight of chlorobenzene are introduced into a reaction vessel equipped with stirrer, thermometer and dropping funnel. 264 Parts by weight of water followed by 207 parts by weight of tetraethylene pentamine are added with stirring. The mixture is maintained at a temperature of between 20° and 30° C. by cooling with ice, and 313 parts by weight of epichlorohydrin are added dropwise while the temperature is maintained below 30° C. 20 Parts by weight of cis-1,4-polybutadiene of the type defined in Example 1 are then added and dissolved with stirring at a constant rate adjusted to 220 revs/min. A suspension of droplets of the condensation mixture in the chlorobenzene phase is formed. The procedure is otherwise as described in Example 1. An anion exchanger having a total volumetric capacity of 2.5 Val/l and containing more than 80 percent of particles having a diameter of between 0.4 and 0.8 mm and to an extent of more than 90 percent of particles having a diameter of between 0.3 and 0.8 mm is obtained.

EXAMPLE 4

The method of preparation is at first the same as described in Example 1 and the same quantities of starting material are used, but after cooling and separation of the non-aqueous phase the condensation product is heated at 140° C. for 24 hours and thereafter left to swell in 30 percent sodium hydroxide solution for 24 hours and then washed with water until neutral. The product has the properties indicated in Example 1.

EXAMPLE 5

The method of preparation is the same as in Example 1 and the same quantities of starting materials are used except that the cis-1,4-polybutadiene used has been prepared with a cobalt catalyst and contains 97 percent of cis-1,4-linkages according to the IR spectrum and has an intrinsic viscosity [$\eta$] of 2.7.

EXAMPLE 6

The method of preparation is the same as in Example 1 and the same quantities of starting materials are used except that the polybutadiene used has been prepared with lithium butyl and that its double bonds according to the IR spectrum are 50 percent trans-1,4-bonds, 43 percent cis-1,4-bonds and 7 percent 1,2-bonds and its intrinsic viscosity [$\eta$] is 1.85.

EXAMPLE 7

The method of preparation is the same as described in Example 1 and the same quantities of starting materials are used except that instead of polybutadiene, an equal quantity of a trans-polypentenamer which according to the IR spectrum has 91.5 percent of trans double bonds and which has an intrinsic viscosity [$\eta$] of 2.67 is used.

EXAMPLE 8

The method of preparation and the quantities of starting materials are the same as in Example 1 except that instead of polybutadiene an equal quantity of a cis-1,4-polyisoprene which according to the IR spectrum has 94 percent of cis-1,4-bonds and which has an intrinsic viscosity [$\eta$] of 1.95 is used.

EXAMPLE 9

The method of preparation and quantities of starting materials used are the same as in Example 1 except that instead of polybutadiene an equal quantity of a statistical butadiene-styrene copolymer containing 25 percent of styrene and having a Mooney viscosity of ML 4′100° C. = 56 is used.

EXAMPLE 10

The method of preparation and quantities of starting materials are the same as in Example 1 except that instead of polybutadiene, a butadiene-styrene block copolymer containing 25 percent of styrene and having a Mooney viscosity of ML 4′100° C. = 50 is used.

EXAMPLE 11

The method of preparation and quantities of starting materials used are the same as in Example 1 except that, instead of polybutadiene, a statistical butadiene-styrene copolymer produced by radical polymerization and containing 23.5 percent of styrene and having a Mooney viscosity of ML 4′100°C. = 115 is used.

We claim:

1. In the process of suspension condensing epihalohydrin and a polyalkylene polyamine having 1 to 10 —NH— moities attached to alkylene moieties having two to four carbon atoms or a precondensate thereof in a hydrocarbon or halogenated hydrocarbon non-solvent in the presence of a dispersing agent, the improvement comprising employing as dispersing agent, 0.01 to 5 percent by weight, based on the weight of the non-solvent, of a member selected from the group consisting of homopolymers of butadiene-1,3, isoprene and pentadiene-1,3, copolymers of mixtures of the aforesaid diolefins and copolymers of the aforesaid diolefins with styrene, acrylic esters or isobutylene.

2. The process of claim 1 wherein said polyalkylene polyamine is selected from the group consisting of diethylene triamine, triethylene tetramine, tetraethylene pentamine and pentaethylene hexamine.

3. The process of claim 1 wherein said non-solvent is orthodichlorobenzene, a mixture of orthodichlorobenzene and chlorobenzene, a mixture of orthodichlorobenzene and isododecane or a mixture of orthodichlorobenzene, chlorobenzene and isododecane.

4. The polycondensation product produced by the process of claim 1.

* * * * *